United States Patent
Ayyanar et al.

(10) Patent No.: US 10,879,839 B2
(45) Date of Patent: *Dec. 29, 2020

(54) POWER CONVERTER CIRCUITRY FOR PHOTOVOLTAIC DEVICES

(71) Applicant: ARIZONA BOARD OF REGENTS ON BEHALF OF ARIZONA STATE UNIVERSITY, Scottsdale, AZ (US)

(72) Inventors: Rajapandian Ayyanar, Gilbert, AZ (US); Yinglai Xia, Tempe, AZ (US); Jinia Roy, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/780,840

(22) PCT Filed: Dec. 5, 2016

(86) PCT No.: PCT/US2016/064930
§ 371 (c)(1),
(2) Date: Jun. 1, 2018

(87) PCT Pub. No.: WO2017/096355
PCT Pub. Date: Jun. 8, 2017

(65) Prior Publication Data
US 2018/0375465 A1    Dec. 27, 2018

Related U.S. Application Data

(60) Provisional application No. 62/263,068, filed on Dec. 4, 2015, provisional application No. 62/300,422, filed on Feb. 26, 2016.

(51) Int. Cl.
*H02M 3/158* (2006.01)
*H02S 40/32* (2014.01)
(Continued)

(52) U.S. Cl.
CPC .............. *H02S 40/32* (2014.12); *H02J 3/383* (2013.01); *H02M 3/1582* (2013.01);
(Continued)

(58) Field of Classification Search
CPC .. H02M 7/487; H02M 7/5387; H02M 3/1582; H02M 3/158; H02M 3/337; H02S 40/32
See application file for complete search history.

(56) References Cited

U.S. PATENT DOCUMENTS 4,603,266 A  *  7/1986  Berger ................ G11C 27/024
                                                    257/236
7,046,534 B2   5/2006  Schmidt et al.
(Continued)

FOREIGN PATENT DOCUMENTS

JP   2015139277   7/2015
KR   20140093355  7/2014
(Continued)

OTHER PUBLICATIONS

Bower, W. et al., "Performance test protocol for evaluating inverters used in gridconnected photovoltaic systems", Sandia National Labratories Solar Technologies, Oct. 2004 [retrieved on Jun. 19, 2019], 46 pages, retrieved from the internet: <URL:https://www.gosolarcalifornia.ca.gov/equipment/documents/2004-11-22_Test_Protocol.pdf>.

(Continued)

*Primary Examiner* — Adolf D Berhane
*Assistant Examiner* — Afework S Demisse
(74) *Attorney, Agent, or Firm* — Withrow & Terranova, P.L.L.C.

(57) ABSTRACT

Power converter circuitry includes a direct current (DC) input comprising a first DC input node and a second DC input node, an alternating current (AC) output comprising a first AC output node coupled to the first DC input node and (Continued)

a second AC output node, a first boost switch coupled between the second DC input node and a boost intermediate node, a second boost switch coupled between the boost intermediate node and a common node, a boost inductor coupled between the boost intermediate node and the first DC input node, a link capacitor coupled between the second DC input node and the common node, a first half-bridge switch coupled between the second DC input node and a half-bridge intermediate node, a second half-bridge switch coupled between the half-bridge intermediate node and the common node, and a half-bridge inductor coupled between the half-bridge intermediate node and the second AC output node.

10 Claims, 6 Drawing Sheets

(51) Int. Cl.
| | | |
|---|---|---|
| *H02M 7/5387* | (2007.01) | |
| *H02J 3/38* | (2006.01) | |
| *H02M 7/48* | (2007.01) | |
| *H02M 7/537* | (2006.01) | |
| *H02M 7/487* | (2007.01) | |

(52) U.S. Cl.
CPC ......... *H02M 7/4826* (2013.01); *H02M 7/537* (2013.01); *H02M 7/5387* (2013.01); *H02M 3/158* (2013.01); *H02M 7/487* (2013.01); *Y02E 10/56* (2013.01)

(56) References Cited

U.S. PATENT DOCUMENTS

| | | | |
|---|---|---|---|
| 7,336,004 B2 * | 2/2008 | Lai | H02M 3/1582 |
| | | | 307/66 |
| 7,411,802 B2 | 8/2008 | Victor et al. | |
| 8,587,975 B2 | 11/2013 | Jain et al. | |
| 8,649,195 B2 | 2/2014 | Mao et al. | |
| 9,018,851 B1 * | 4/2015 | Melanson | H05B 45/40 |
| | | | 315/247 |
| 9,413,269 B2 | 8/2016 | Ayyanar | |
| 2012/0087157 A1 | 4/2012 | Huang et al. | |
| 2016/0294316 A1 * | 10/2016 | Huang | H02P 29/50 |
| 2017/0005563 A1 | 1/2017 | Ayyanar | |

FOREIGN PATENT DOCUMENTS

| | | | | |
|---|---|---|---|---|
| WO | 2014004575 A1 | | 1/2014 | |
| WO | WO-2014004575 A1 * | | 1/2014 | H02M 1/15 |
| WO | 2015105795 A1 | | 7/2015 | |

OTHER PUBLICATIONS

Breazeale, L. et al., "A Photovoltaic Array Transformer-Less Inverter With Film Capacitors and Silicon Carbide Transistors", IEEE Transactions on Power Electronics, Mar. 2015 (date of publication: May 2014), vol. 30, No. 3, pp. 1297-1305 <DOI:10.1109/TPEL.2014.2321760>.
Brekken, T. et aL, "Utility-connected power converter for maximizing power transfer from a photovoltaic source while drawing ripple-free current", IEEE Power Electronics Specialists Conference (Cairns, Australia, Jun. 23-27), 2002 (date added to IEEE Xplore: Nov. 2002), pp. 1518-1522 <DOI:10.1109/PSEC.2002.1022391>.
Cree Inc., "C2D05120A Silicon Carbide Schottky Diode: Zero Recovery Rectifier", Cree, 2013 [retrieved Jun. 11, 2019], 6 pages, retrieved from the internet: <URL:https://www.wolfspeed.com/media/downloads/50/C2D05120A.pdf>.
Cree Inc., "C2M0080120D Silicon Carbide Power Mosfet C2M Mosfet Technology: N-Channel Enhancement Mode", Cree, 2014 [retrieved Jun. 11, 2019 as it appeared on archive.org on Aug. 7, 2015], 10 pages, retrieved from the internet: <URL:https://web.archive.org/web/20150807041850/http://www.cree.com/~/media/Files/Cree/Power/Data% 20Sheets/C2M0080120D.pdf>.
Denholm, P. et al., "Bright Future: Solar Power as a Major Contributor to the U.S. Grid", IEEE Power and Energy Vlagazine, Mar.-Apr. 2013 (date of publication: Feb. 2013), vol. 11, No. 2, pp. 22-32 <DOI:10.1109/MPE.2012.2234404>.
Dsire., "Database of State Incentives for Renewables & Efficiency" [online], Dsire, Mar. 2015 [retrieved May 31, 2019 as it appeared on archive.org on Mar. 5, 2019], retrieved from the internet: <URL:https://web.archive.org/web/20150305173501/http://www.dsireusa.org/>.
Dunlop, E. et al., "20 years of life and more: Where is the end of life of a PV module?", 31st IEEE Photovoltaic Specialists Conference (Lake Buena Vista, FL, Jan. 3-7, 2005), 2005 (date added to IEEE Xplore: Aug. 2005), pp. 1593-1596 <DOI:10.1109/PVSC.2005.1488449>.
Fu, L. et aL, "The development of a high-voltage power device evaluation platform", IEEE Workshop on Wide Bandgap Power Devices and Applications (Knoxville, TN, Oct. 13-15, 2014), 2014 (date added to IEEE Xplore: Nov. 2014), pp. 13-17 <DOI:10.1109/WiPDA.2014.6964615>.
Go Solar California., "California Solar Initiative Program Handbook", California Public Utilities Commission, Jan. 2017, 219 pages.
Gonzalez, R. et al., "Transformerless inverter for single-phase photovoltaic systems", IEEE Transactions on Power Eectronics, Mar. 2007, Vol. 22, No. 2, pp. 693-697 <DOI:10.1109/TPEL.2007.892120>.
Gu, B. et al., "High reliability and efficiency single-phase transformerless inverter for grid connected photovoltaic systems", IEEE Transactions on Power Electronics, May 2013 (date of publication Aug. 2012), vol. 28, No. 5, pp. 2235-2245 <DOI:10.1109/TPEL.2012.2214237>.
Gu, Y. et al., "Transformerless inverter with virtual DC bus concept for cost-effective grid-connected PV power systems", IEEE Transactions on Power Electronics, Feb. 2013 (date of publication: Jun. 2012), vol. 28, No. 2, pp. 793-805 <DOI:10.1109/TEPL.2012.2203612>.
Guo, F. et al., "Development of an 85-kW Bidirectional Quasi-Z-Source Inverter With DC-Link Feed-Forward Compensation for Electric Vehicle Applications", IEEE Transactions on Power Electronics, Dec. 2013 (date of publication: Jan. 2013), vol. 28, No. 12, pp. 5477-5488 <DOI:10.1109/TPEL.2012.2237523>.
Khajehoddin, S. et al., "DC-Bus Design and Control for a Single-Phase Grid-Connected Renewable Converter With a Small Energy Storage Component", IEEE Transactions on Power Electronics, Jul. 2013 (date of publication: Oct. 2012), vol. 28, No. 7, pp. 3245-3254 <DOI:10.1109/TPEL.2012.2222449>.
Kjaer, S. et al., "A review of single-phase grid-connected inverters for photovoltaic modules", IEEE Transactions on Industry Applications, Sep.-Oct. 2005 (date of publication: Sep. 2005), vol. 41, No. 5, pp. 1292-1306 <DOI:10.1109/TIA.2005.853371>.
Krein, P. et al., "Minimum Energy and Capacitance Requirements for Single-Phase Inverters and Rectifiers Using a Ripple Port", IEEE Transactions on Power Electronics, Nov. 2012 (date of publication: Feb. 2012), vol. 27, No. 11, pp. 4690-4698 <DOI:10.1109/TPEL.2012.2186640>.
Kulasekaran, S. et aL, "Switching frequency optimization of a high-frequency link based energy storage system", 40th Annual Conference of the IEEE Industrial Electronics Society (Dallas, TX, Oct. 29-Nov. 1, 2014), 2014 (date added to IEEE Xplore: Feb. 2015), pp. 1847-1853 <DOI:10.1109/IECON.2014.7048753>.
Kulkarni, C. et al., "Physics based electrolytic capacitor degradation models for prognostic studies under thermal overstress", Proceedings of First European Conference of the Prognostics and Health Management Society (Dresden, Germany, Jul. 3-5, 2012), Jun. 2012, 9 pages.
Lamar, D. et al., "On the Limit of the Output Capacitor Reduction in Power-Factor Correctors by Distorting the Line Input Current", (56) References Cited

OTHER PUBLICATIONS

IEEE Transactions on Power Electronics, Mar. 2012 (date of publication: Sep. 2010), vol. 27, No. 3, pp. 1168-1176 <DOI:10.1109/TPEL.2010.2075943>.

Lei, Y. et al., "A 2 kW, single-phase, 7-level, GaN inverter with an active energy buffer achieving 216 W/in3 power density and 97.6% peak efficiency", IEEE Applied Power Electronics Conference and Exposition (Long Beach, CA, Mar. 20-24, 2016), 2016 (date added to IEEE Xplore: May 2016), pp. 1512-1519 <DOI:10.1109/APEC.2016.7468068>.

Li, H. et al., "Active power decoupling for high-power single-phase PWM rectifiers", IEEE Transactions on Power Electronics, Mar. 2013 (date of publication: Jul. 2012), vol. 28, No. 3, pp. 1308-1319 <DOI:10.1109/TPEL.2012.2208764>.

Li, S. et al., "Direct AC/DC Rectifier With Mitigated Low-Frequency Ripple Through Inductor-Current Waveform control", IEEE Transactions on Power Electronics, Aug. 2015 (date of publication: Sep. 2014), vol. 30, No. 8, pp. 4336-4348 <DOI:10.1109/TPEL.2014.2360209>.

Li, W. et al., "Topology Review and Derivation Methodology of Single-Phase Transformerless Photovoltaic Inverters for Leakage Current Suppression", IEEE Transactions on Industrial Electronics, Jul. 2015 (date of publication: Feb. 2015), vol. 62, No. 7, pp. 4537-4551 <DOI:10.1109/TIE.2015.2399278>.

Liu, W. et al., "Modeling and Design of Series Voltage Compensator for Reduction of DC-Link Capacitance in Grid-Tie Solar Inverter", IEEE Transactions on Power Electronics, May 2015 (date of publication: Jul. 2014), vol. 30, No. 5, pp. 2534-2548 <DOI:10.1109/TPEL.2014.2336856>.

Ló, Ó. et al., "Eliminating Ground Current in a Transformerless Photovoltaic Application", IEEE Transactions on Energy Conversion, Mar. 2010 (date of publication: Jan. 2010), vol. 25, No. 1, pp. 140-147 <DOI:10.1109/TEC.2009.2037810>.

Lopez, O. et al., "Multilevel transformerless topologies for single-phase grid-connected converters", 32nd Annual Conference on IEEE Industrial Electronics (Paris, France, Nov. 6-10, 2006), 2006 (Date added to IEEE Xplore: Apr. 2007), pp. 5191-5196 <DOI:10.1109/IECON.2006.347656>.

Nyserda., "Current Funding Opportunities, PONs, RFPs, and RFQs"[online], New York State of Opportunity, Mar. 2015 [retrieved May 31, 2019 as it appeared on archive.org on Mar. 2015], retrieved from the internet: <URL:https://web.archive.org/web/20150311144128/http://www.nyserda.ny.gov/Funding/>.

Ohnuma, Y. et al., "A Single-Phase Current-Source PV Inverter With Power Decoupling Capability Using an Active Buffer", IEEE Transactions on Industry Applications, Jan.-Feb. 2015 (date of publication: Aug. 2014), vol. 51, No. 1, pp. 531-538 <DOI:10.1109/TIA.2014.2347312>.

Patent Cooperation Treaty, International Searching Authority, International Preliminary Report on Patentability for PCT/US2016/064930, 9 pages, report issued Jun. 5, 2018, opinion dated Mar. 28, 2017.

Patent Cooperation Treaty, International Searching Authority, International Search Report for PCT/US20161064930, 3 pages, dated Mar. 28, 2017.

Pelletier, P. et al., "Optimization of a DC Capacitor Tank", IEEE Transactions on Industry Applications, Mar.-Apr. 2009, vol. 45, No. 2, pp. 880-886 <DOI:10.1109/TIA.2009.2013579>.

Qi, W. et al., "A novel active power decoupling single-phase PWM rectifier topology", IEEE Applied Power Electronics Conference and Exposition (Fort Worth, TX, Mar. 16-20, 2014), 2014 (date added to IEEE Xplore: Apr. 2014), pp. 39-95 <DOI:10.1109/APEC.2014.6803293>.

Su, M. et al., "An Active Power-Decoupling Method for Single-Phase AC-DC Converters", IEEE Transactions on Industrial Informatics, Feb. 2014 (date of publication: May 2013), vol. 10, No. 1, pp. 461-468 <DOI:10.1109/TII.2013.2261081>.

Sullivan, C. et al., "Decrease in photovoltaic power output from ripple: Simple general calculation and the effect of partial shading", IEEE Transactions on Power Electronics, Feb. 2013 (date of publication: Jun. 2012), vol. 28, No. 2, pp. 740-747 <DOI:10.1109/TPEL.2012.2205162>.

Tan, K. et aL, "Zero standby power high efficiency hot plugging outlet for 380VDC power delivery system", IEEE Applied Power Electronics Conference and Exposition (Long Beach, CA, Mar. 20-24, 2016), 2016 (date added to IEEE Xplore: May 2016), pp. 132-137 <DOI:10.1109/APEC.2016.7467863>.

Tang, Y. et al., "A Component-Minimized Single-Phase Active Power Decoupling Circuit With Reduced Current Stress to Semiconductor Switches", IEEE Transactions on Power Electronics, Jun. 2015 (date of publication Nov. 2014), vol. 30, No. 6, pp. 2905-2910 <DOI:10.1109/TPEL.2014.2369959>.

Tang, Y. et al., "Decoupling of Fluctuating Power in Single-Phase Systems Through a Symmetrical Half-Bridge circuit", IEEE Transactions on Power Electronics, Apr. 2015 (date of publication: May 2014), vol. 30, No. 4, pp. 1855-1865 <DOI:10.1109/TPEL.2014.2327134>.

Wang, H. et al., "Transitioning to Physics-of-Failure as a Reliability Driver in Power Electronics", IEEE Journal of Emerging and Selected Topics in Power Electronics, Mar. 2014 (date of publication 2013), vol. 2, No. 1, pp. 97-114 <DOI:10.1109/JESTPE.2013.2290282>.

Wang, H. et al., "Use of a Series Voltage Compensator for Reduction of the DC-Link Capacitance in a Capacitor-Supported System", IEEE Transactions on Power Electronics, Mar. 2014 (date of publication: May 2013), vol. 29, vol. 3. pp. 1163-1175 <DOI:10.1109/TPEL.2013.2262057>.

Wang, R. et al., "A high power density single-phase PWM rectifier with active ripple energy storage", IEEE Transactions on Power Electronics, May 2011 (date of publication: Nov. 2010), vol. 26, No. 5, pp. 1430-1443 DOI:10.1109/TPEL.2010.2090670>.

Xia, Y. et al., "A high performance T-type single phase double grounded transformer-less photovoltaic inverter with active power decoupling", IEEE Energy Conversion Congress and Exposition (Milwaukee, WI, Sep. 18-22, 2016), 2016 (Date added to IEEE Xplore: Feb. 2017), 7 pages <DOI:10.1109/ECCE.2016.7854693>.

Xia, Y. et al., "High performance ZVT with bus clamping modulation technique for single phase full bridge inverters", IEEE Applied Power Electronics Conference and Exposition (Long Beach, CA, Mar. 20-24, 2016), 2016 (date added to IEEE Xplore: May 2016), pp. 3364-3369 <DOI:10.1109/APEC.2016.7468350>.

Xia, Y. et al., "Optimal variable switching frequency scheme to reduce combined switching loss and inductor core loss of single phase grid connected inverter", IEEE Energy Conversion Congress and Exposition (Montreal, Canada, Sep. 20-24, 2015), 2015 (date added to IEEE Xplore: Oct. 2015), pp. 1534-1540 <DOI:10.1109/ECCE.2015.7309876>.

Xue, Y. et aL, "Topologies of single-phase inverters for small distributed power generators: an overview", IEEE Transactions on Power Electronics, Sep. 2004, vol. 19, No. 5, pp. 1305-1314 <DOI:10.1109/TPEL2004.833460>.

Yang, B. et aL, "Improved transformerless inverter with common-mode leakage current elimination for a photovoltaic grid-connected power system", IEEE Transactions on Power Electronics, Feb. 2012 (date of publication: Jun. 2011), vol. 27, No. 2, pp. 752-762 <DOI:10.1109/TPEL.2011.2160359>.

Yang, Y. et aL, "Overview of Single Phase Grid-Connected Photovoltaic Systems", Electric Power Components, Jul. 2015, vol. 43, No. 12, pp. 1352-1363 <DOI.10.1080/15325008.2015.1031296>.

Yu, W. et aL, "High-efficiency inverter with H6-type configuration for photovoltaic non-isolated ac module applications", 25th Annual IEEE Applied Power Electronics Conference and Exposition (Palm Springs, CA, Feb. 21-25, 2010), 2010 (Date added to IEEE Xplore: Mar. 2010), 6 pages <DOI:10.1109/APEC.2010.5433372>.

Zhang, L. et aL, "A family of neutral point clamped full-bridge topologies for transformerless photovoltaic grid-tied inverters", IEEE Transactions on Power Electronics, Feb. 2013 (date of publication: Jun. 2012), vol. 28, No. 2, pp. 730-739 <DOI:10.1109/TPEL.2012.2205406>.

* cited by examiner

POWER CONVERTER CIRCUITRY FOR PHOTOVOLTAIC DEVICES

RELATED APPLICATIONS

This application is a 35 USC 371 national phase filing of PCT/US16/64930, filed Dec. 5, 2016, which claims the benefit of U.S. provisional patent application Ser. No. 62/263,068, filed Dec. 4, 2015, and U.S. provisional patent application Ser. No. 62/300,422, filed Feb. 26, 2016, the disclosures of which are hereby incorporated herein by reference in their entireties.

GOVERNMENT SUPPORT

The information, data, or work presented herein was funded in part by the Office of Energy Efficiency and Renewable Energy (EERE), U.S. Department of Energy, under Award Number DE-EE0006521 with North Carolina State University, PowerAmerica Institute.

FIELD OF THE DISCLOSURE

The present disclosure relates to power converter circuitry for photovoltaic devices, and specifically to transformer-less power converter circuitry for photovoltaic devices.

BACKGROUND

Photovoltaic devices and other renewable energy sources continue to gain traction in the modern energy market. Photovoltaic devices provide a direct current (DC) output signal, which must be converted into an alternating current (AC) signal by power converter circuitry for transmission over an AC electrical grid or use by an AC load. Conventional power converter circuitry for photovoltaic devices has typically included one or more transformers, which isolate the photovoltaic devices from the AC electrical grid or AC load. While generally effective at converting a DC output from one or more photovoltaic devices into an AC signal suitable for transmission over an AC electrical grid or use by an AC load, the transformers in conventional power converter circuitry may raise cost, cause losses and thus reduce efficiency, increase complexity, and drive up both size and weight. Accordingly, there has been a recent trend towards transformer-less power converter circuitry for photovoltaic devices.

Transformer-less power converter circuitry for photovoltaic devices provides several design challenges. First, there is a safety hazard posed by such power converter circuitry due to a lack of isolation between one or more photovoltaic panels and an AC electrical grid or AC load. This problem can typically be addressed by requiring extensive and reliable ground fault interrupt protection mechanisms.

Second, photovoltaic devices are generally associated with large capacitive ground currents. This is due to the fact that photovoltaic devices include one or more photovoltaic panels that are mounted on and electrically isolated from a chassis. Code requires grounding of the chassis, and a parasitic capacitance is thus formed between each one of the photovoltaic panels and the chassis. When a transformer isolates the photovoltaic panels from the AC electrical grid, it is possible to connect one of a positive output or a negative output of one or more photovoltaic panels in the photovoltaic device to ground, effectively nullifying the parasitic capacitance discussed above. However, such an approach is not possible when using transformer-less power converter circuitry as it would lead to short-circuiting of the photovoltaic panels during operation thereof. Accordingly, a major design challenge of power converter circuitry for photovoltaic devices is the reduction or elimination of undesirable capacitor currents that often interfere with normal operation.

Third, to maximize efficiency of a photovoltaic device, the power drawn therefrom should be maintained at a relatively constant value (e.g., at a maximum power point). In contrast, the power supplied to an AC electrical grid or AC load is not constant, but instead pulses at approximately twice the line frequency (e.g., 120 Hz for a line frequency of 60 Hz, as is typical in the United States). The difference in output power requirements from photovoltaic devices and input power requirements of an AC electrical grid or AC load can be compensated for with a storage element such as a capacitor. Conventionally, large electrolytic capacitors have been used to enable the power converter circuitry to operate with the relatively large power pulsations of an AC electrical grid or AC load. However, electrolytic capacitors are notoriously unreliable, and are often the leading cause of failure in power converter circuitry for photovoltaic devices. Further, these conventional storage devices and the topologies in which they are utilized may still fail to maintain a constant power draw from the photovoltaic devices, which may reduce the efficiency and thus the energy that is harvested therefrom.

Figure 1:
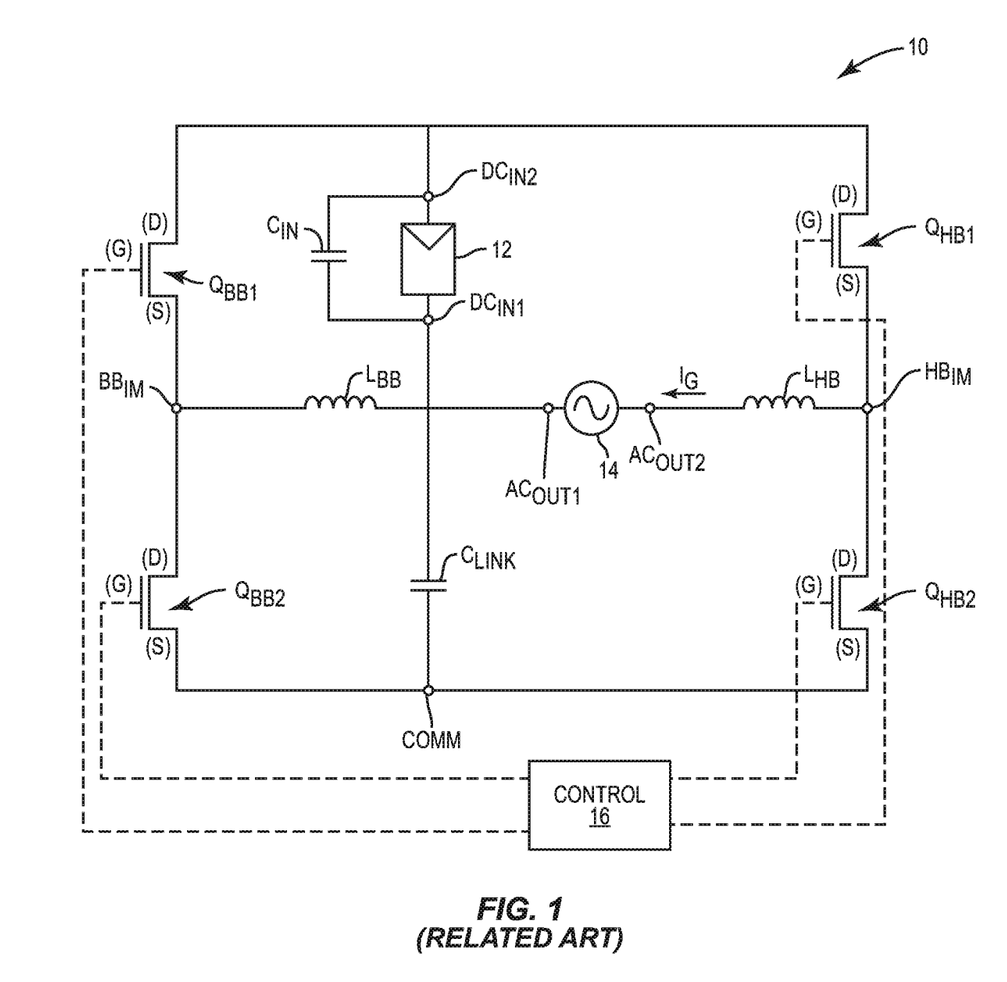
FIG. 1 is a functional schematic illustrating conventional power converter circuitry.

FIG. 1 shows transformer-less power converter circuitry 10 meant to address the foregoing issues as described in U.S. Pat. No. 9,413,269. The power converter circuitry 10 includes a direct current (DC) input comprising a first DC input node $DC_{IN1}$ and a second DC input node $DC_{IN2}$, an alternating current (AC) output node comprising a first AC output node $AC_{OUT1}$ and a second AC output node $AC_{OUT2}$, a link capacitor $C_{LINK}$, a buck-boost converter, and a half-bridge converter. The first AC output node $AC_{OUT1}$ is coupled to the first DC input node $DC_{IN1}$. The buck-boost converter includes a first buck-boost switching element $Q_{BB1}$ coupled between the second DC input node $DC_{IN2}$ and a buck-boost intermediate node $BB_{IM}$, a second buck-boost switching element $Q_{BB2}$ coupled between the buck-boost intermediate node $BB_{IM}$ and a common node COMM, and a buck-boost inductor $L_{BB}$ coupled between the buck-boost intermediate node $BB_{IM}$ and the first DC input node $DC_{IN1}$. The link capacitor $C_{LINK}$ is coupled between the first DC input node $DC_{IN1}$ and the common node COMM. The half-bridge converter includes a first half-bridge switching element $Q_{HB1}$ coupled between the second DC input node $DC_{IN2}$ and a half-bridge intermediate node $HB_{IM}$, a second half-bridge switching element $Q_{HB2}$ coupled between the half-bridge intermediate node $HB_{IM}$ and the common node COMM, and a half-bridge inductor $L_{HB}$ coupled between the half-bridge intermediate node $HB_{IM}$ and the second AC output node $AC_{OUT2}$. For purposes of illustration, a photovoltaic panel 12 is coupled in parallel with an input capacitor $C_{IN}$ between the first DC input node $DC_{IN1}$ and the second DC input node $DC_{IN2}$, and the AC output is connected to an AC electrical grid 14 such that the first AC output node $AC_{OUT1}$ is connected to a neutral connection of the AC electrical grid 14.

As shown, the first buck-boost switching element $Q_{BB1}$, the second buck-boost switching element $Q_{BB2}$, the first half-bridge switching element $Q_{HB1}$, and the second half-bridge switching element $Q_{HB2}$ may be metal-oxide-semiconductor field-effect transistors (MOSFETs) including a gate contact (G), a drain contact (D), and a source contact (C). Power converter control circuitry 16 is coupled to each one of the first buck-boost switching element $Q_{BB1}$, the second buck-boost switching element $Q_{BB2}$, the first half-bridge switching element $Q_{HB1}$, and the second half-bridge switching element $Q_{HB2}$ and configured to provide switching control signals to each one of the switching elements in order to control the state thereof. In particular, the first buck-boost switching element $Q_{BB1}$ and the second buck-boost switching element $Q_{BB2}$ may be operated in conjunction with the buck-boost inductor $L_{BB}$ to maintain a substantially constant power draw from the photovoltaic panel 12 while charging the link capacitor $C_{LINK}$. The first half-bridge switching element $Q_{HB1}$ and the second half-bridge switching element $Q_{HB2}$ may be operated in conjunction with the half-bridge inductor $L_{HB}$ to provide an AC output signal to the AC electrical grid 14. The topology and operation of the power converter circuitry 10 allows the size of the link capacitor $C_{LINK}$ to be substantially smaller than what has previously been attainable for transformer-less power converter circuitry used with photovoltaic devices. Accordingly, the link capacitor $C_{LINK}$ may be provided as a film capacitor or the like, thereby substantially increasing the reliability of the power converter circuitry 10. Further, by connecting the first DC input node $DC_{IN1}$ to the first AC output node $AC_{OUT1}$, which is a neutral connection to the AC electrical grid 14, at least one side of the photovoltaic panel 12 is effectively grounded, thereby reducing or eliminating the parasitic capacitance between the photovoltaic panel 12 and a chassis to which it is mounted as discussed above.

While the power converter circuitry 10 may mitigate one or more of the problems associated with transformer-less power converter circuitry for photovoltaic devices, there is room for improvement. In particular, it may be desirable to further reduce the size of the link capacitor and further increase the reliability and efficiency of the power converter circuitry.

SUMMARY

The present disclosure relates to power converter circuitry for photovoltaic devices, and specifically to transformer-less power converter circuitry for photovoltaic devices. In one embodiment, power converter circuitry includes a direct current (DC) input, an alternating current (AC) output, a first boost switch, a second boost switch, a boost inductor, a link capacitor, a first half-bridge switch, a second half-bridge switch, and a half-bridge inductor. The DC input includes a first DC input node and a second DC input node. The AC output includes a first AC output node coupled to the first DC input node and a second AC output node. The first boost switch is coupled between the second DC input node and a boost intermediate node. The second boost switch is coupled between the boost intermediate node and a common node. The boost inductor is coupled between the boost intermediate node and the first DC input node. The link capacitor is coupled between the second DC input node and the common node. The first half-bridge switch is coupled between the second DC input node and a half-bridge intermediate node. The second half-bridge switch is coupled between the half-bridge intermediate node and the common node. The half-bridge inductor is coupled between the half-bridge intermediate node and the second AC output node. By arranging the components of the power converter circuitry as discussed above, a power draw from a DC device at the DC input may be maintained at a substantially constant value while providing an AC output signal, and a capacitance that may be present across the DC device (e.g., a photovoltaic device) may be reduced. Further, the size of the capacitor may be kept relatively small, which may forego the need for an unreliable electrolytic capacitor. Accordingly, the power converter circuitry may be used with DC devices such as photovoltaic devices without using a transformer and providing desirable performance and reliability.

In one embodiment, the power converter circuitry further includes control circuitry coupled to the first boost switch, the second boost switch, the first half-bridge switch, and the second half-bridge switch. The control circuitry may be configured to maintain a power drawn from a DC device coupled to the DC input at a substantially constant value while providing an AC output signal at the AC output. In one embodiment, the control circuitry is configured to track a maximum power point of an output of the DC device. In one embodiment, the control circuitry is further configured to maximize a power conversion efficiency of the power converter circuitry. In one embodiment, the control circuitry is configured to control a state of the first half-bridge switch and the second half-bridge switch based on a voltage at the output of the DC device, a current at the output of the DC device, and a voltage at the AC output.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
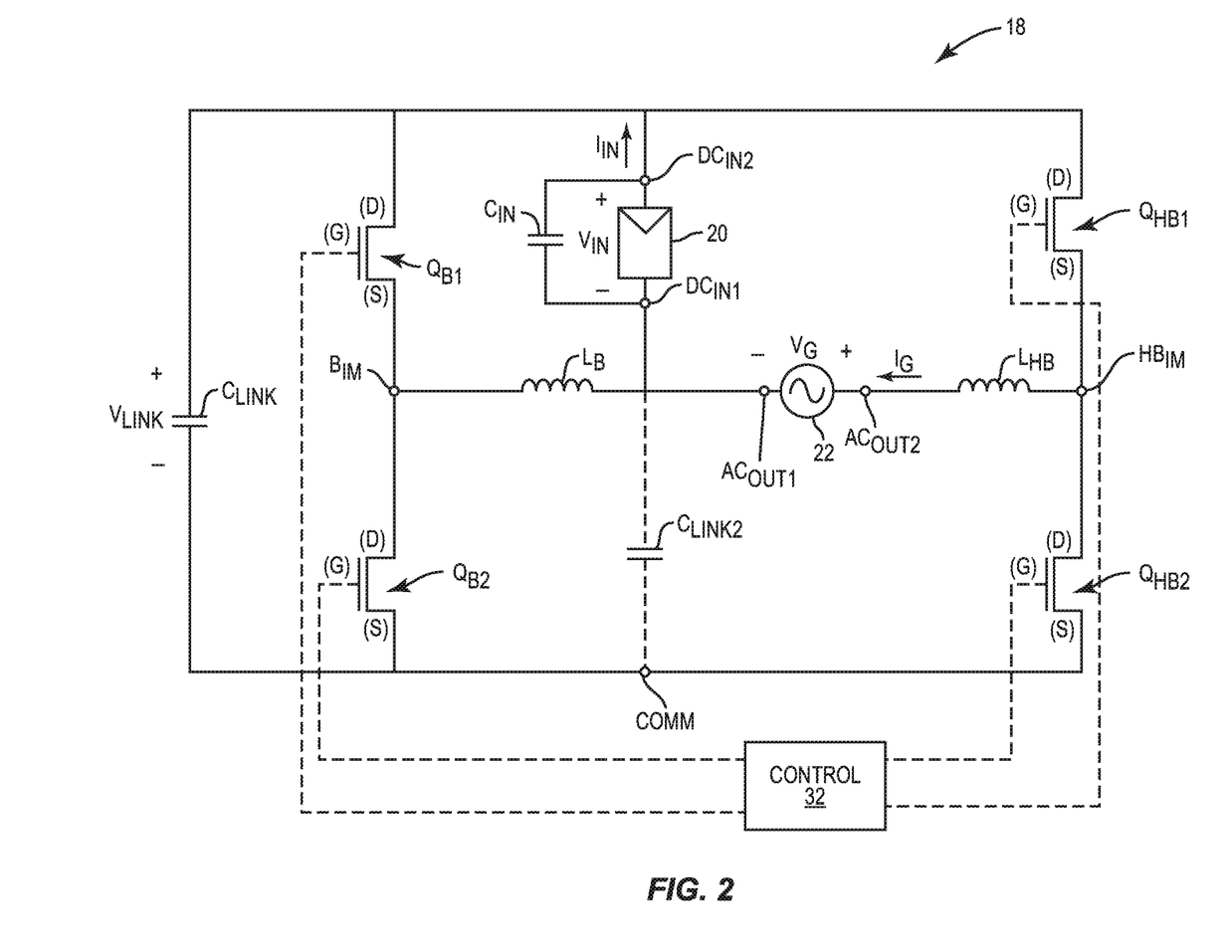
FIG. 2 is a functional schematic illustrating power converter circuitry according to one embodiment of the present disclosure.

FIG. 2 shows power converter circuitry 18 according to one embodiment of the present disclosure. The power converter circuitry 18 includes a direct current (DC) input comprising a first DC input node $DC_{IN1}$ and a second DC input node $DC_{IN2}$, an alternating current (AC) output comprising a first AC output node $AC_{OUT1}$ and a second AC output node $AC_{OUT2}$, a link capacitor $C_{LINK}$, a boost converter, and a half-bridge converter. The first AC output node $AC_{OUT1}$ is coupled to the first DC input node $DC_{IN1}$. The boost converter includes a first boost switching element $Q_{B1}$ coupled between the second DC input node $DC_{IN2}$ and a boost intermediate node $B_{IM}$, a second boost switching element $Q_{B2}$ coupled between the boost intermediate node $B_{IM}$ and a common node COMM, and a boost inductor $L_B$ coupled between the boost intermediate node $B_{IM}$ and the first DC input node $DC_{IN1}$. The link capacitor $C_{LINK}$ is coupled between the second DC input node $DC_{IN2}$ and the common node COMM. The half-bridge converter includes a first half-bridge switching element $Q_{HB1}$ coupled between the second DC input node $DC_{IN2}$ and a half-bridge intermediate node $HB_{IM}$, a second half-bridge switching element $Q_{HB2}$ coupled between the half-bridge intermediate node $HB_{IM}$ and the common node COMM, and a half-bridge inductor $L_{HB}$ coupled between the half-bridge intermediate node $HB_{IM}$ and the second AC output node $AC_{OUT2}$. For purposes of illustration, a photovoltaic panel 20 is coupled in parallel with an input capacitor $C_{IN}$ between the first DC input node $DC_{IN1}$ and the second DC input node $DC_2$, and the AC output is connected to an AC electrical grid 22 such that the first AC output node $AC_{OUT1}$ is coupled to a neutral connection of the AC electrical grid 22. In some embodiments, an optional additional link capacitor $C_{LINK2}$ is coupled between the first DC input node $DC_{IN1}$ and the common node COMM.

Power converter control circuitry 24 is coupled to each one of the first boost switching element $Q_{B1}$, the second boost switching element $Q_{B2}$, the first half-bridge switching element $Q_{HB1}$, and the second half-bridge switching element $Q_{HB2}$ and configured to provide switching control signals to each one of the switching elements in order to control the state thereof. As shown in FIG. 2, each one of the first boost switching element $Q_{B1}$, the second boost switching element $Q_{B2}$, the first half-bridge switching element $Q_{HB1}$, and the second half-bridge switching element $Q_{HB2}$ may be transistor devices such as metal-oxide-semiconductor field-effect transistors (MOSFETs) including a gate contact (G), a drain contact (D), and a source contact (S). Specifically, the first boost switching element $Q_{B1}$, the second boost switching element $Q_{B2}$, the first half-bridge switching element $Q_{HB1}$, and the second half-bridge switching element $Q_{HB2}$ may be silicon carbide MOSFETs that provide high blocking capability and low on-state resistance. Those skilled in the art will appreciate that any suitable switching element may be used for each one of the first boost switching element $Q_{B1}$, the second boost switching element $Q_{B2}$, the first half-bridge switching element $Q_{HB1}$, and the second half-bridge switching element $Q_{HB2}$ without departing from the principles herein.

The power converter control circuitry 24 may be configured to operate the first boost switching element $Q_{B1}$ and the second boost switching element $Q_{B2}$ such that a power drawn from the photovoltaic panel 20 remains substantially constant while charging the link capacitor $C_{LINK}$. Specifically, the power converter control circuitry 24 may operate the first boost switching element $Q_{B1}$ and the second boost switching element $Q_{B2}$ such that a maximum power point of an output of the photovoltaic panel 20 is tracked. The power converter control circuitry 24 may operate the first half-bridge switching element $Q_{HB1}$ and the second half-bridge switching element $Q_{HB2}$ to provide an AC output signal to the AC electrical grid 22. The input capacitor $C_{IN}$ is provided to filter ripple at the switching frequency of the switching elements and is thus designed based on the maximum allowable high-frequency voltage ripple. The input capacitor $C_{IN}$ is not designed to store energy for power pulsation due to the connected AC electrical grid 14, since this is accomplished by the link capacitor $C_{LINK}$ as discussed in detail below.

Figure 3A:
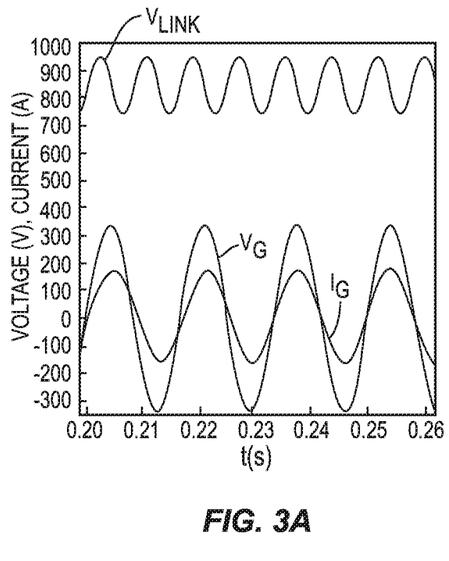
FIGS. 3A-3C are a series of graphs illustrating the operation of power converter circuitry according to one embodiment of the present disclosure.
Figure 3B:
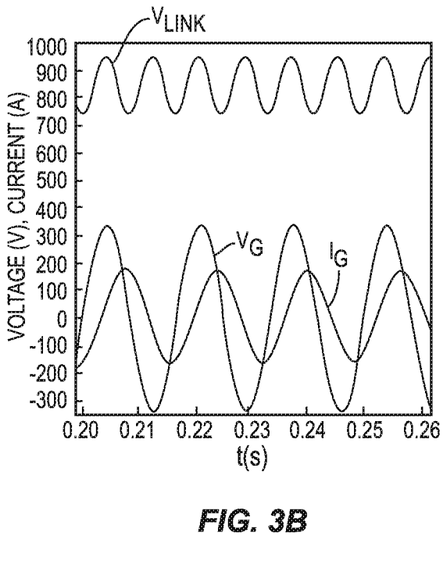
Figure 3C:
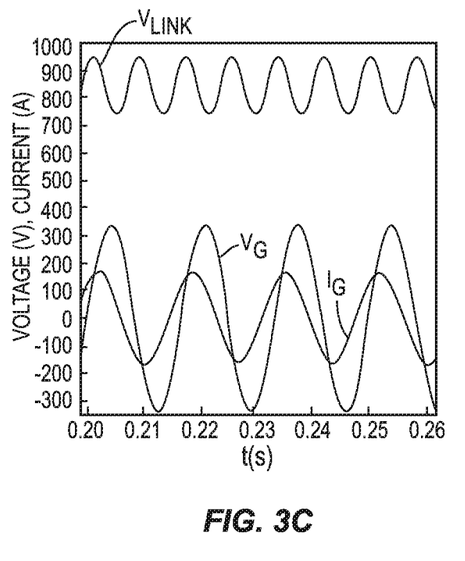
Figure 4A:
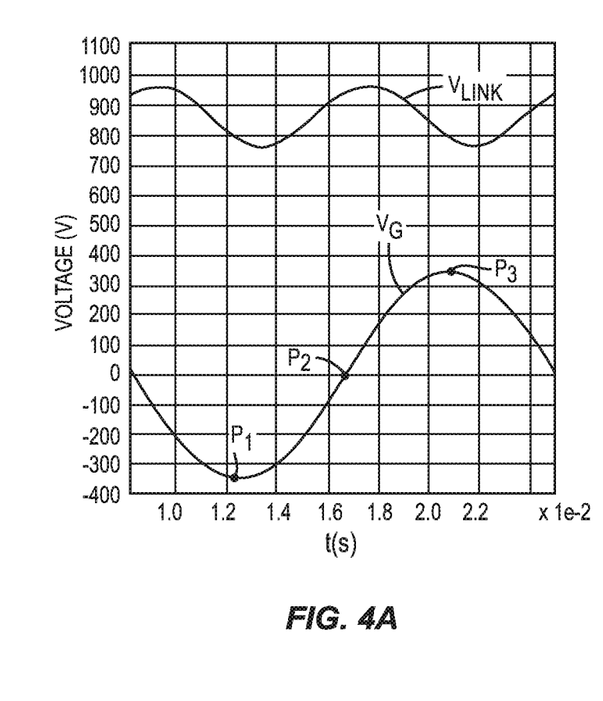
FIGS. 4A-4D are a series of graphs illustrating the operation of power converter circuitry according to one embodiment of the present disclosure.
Figure 4B:
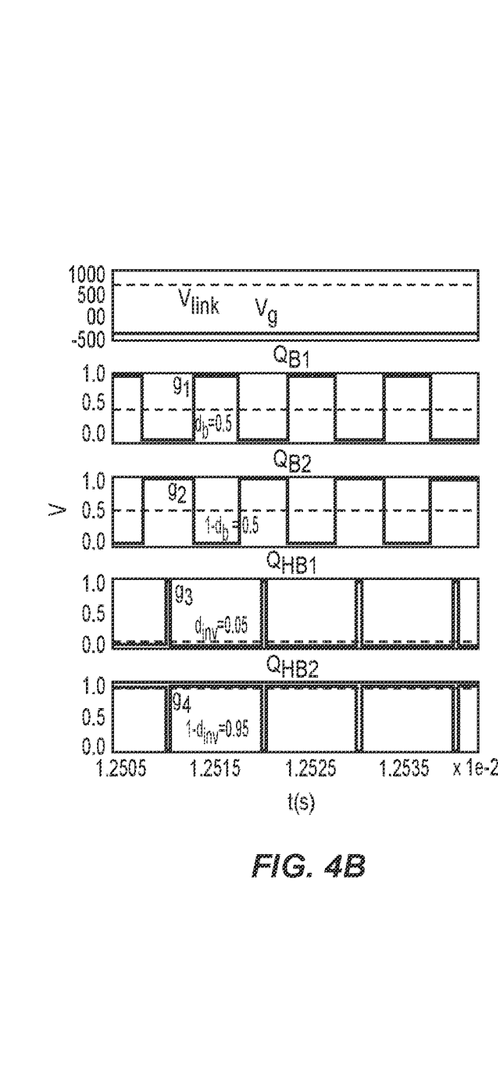
Figure 4C:
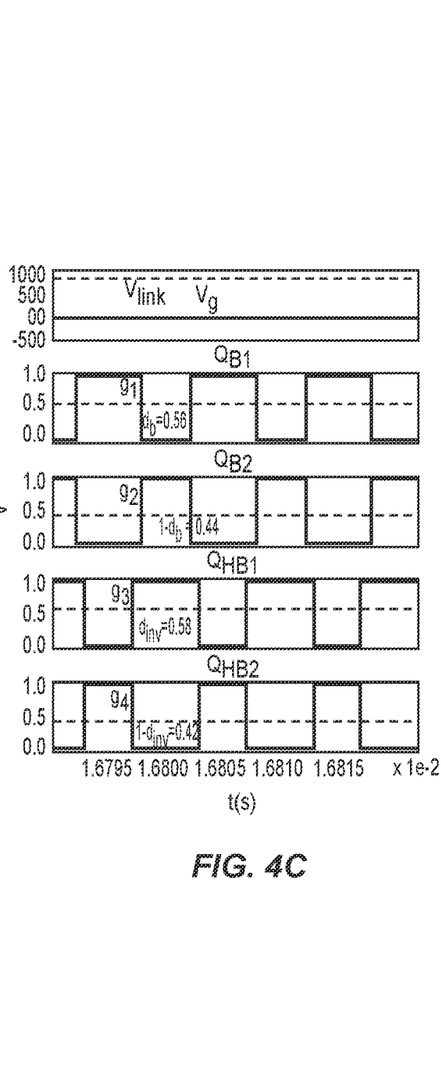
Figure 4D:
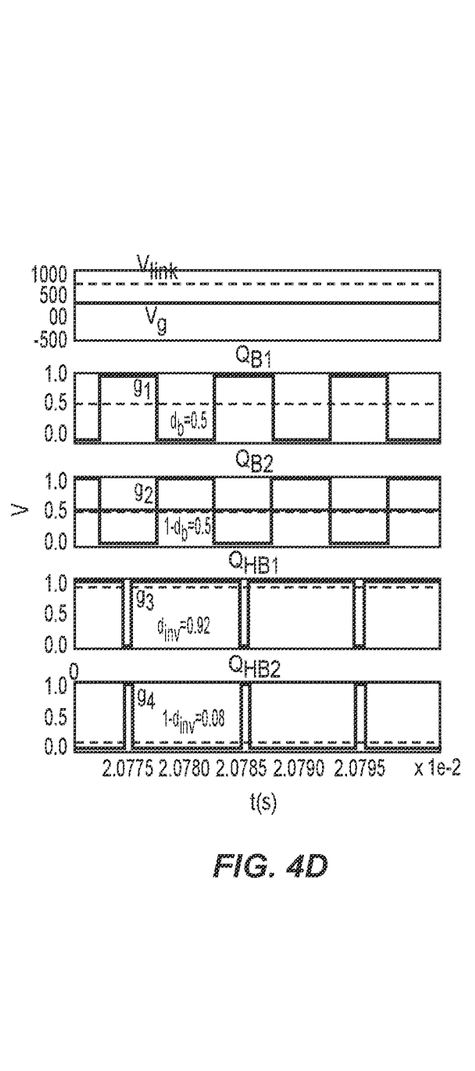

The boost converter effectively boosts a DC input voltage $V_{IN}$ provided by the photovoltaic panel 20 at the DC output to provide a link voltage $V_{LINK}$ across the link capacitor $C_{LINK}$. This boosted link voltage $V_{LINK}$ together with the input voltage $V_{IN}$ from the photovoltaic panel 20 is then converted by the half-bridge converter into an AC grid voltage $V_G$, which is provided at the AC output. The power drawn ($V_{IN}$, $I_{IN}$) from the photovoltaic panel 20 remains relatively constant in order to maximize the energy harvest and efficiency thereof. In one embodiment, the input voltage $V_{IN}$ from the photovoltaic panel 20 may be maintained at 400 V with minimal ripple. The pulsating power required by the half-bridge converter to deliver the grid voltage $V_G$ is provided by the link capacitor $C_{LINK}$, which stores energy when the instantaneous grid power is less than the power drawn from the photovoltaic panel 20 and releases stored energy when the instantaneous grid power is higher than the power drawn from the photovoltaic panel 20. The voltage swing in the link voltage $V_{LINK}$ is designed to be significantly larger than in conventional converters to reduce the size of link capacitor $C_{LINK}$. Details of the relationship between the input voltage $V_{IN}$, the link voltage $V_{LINK}$, and the grid voltage $V_G$ are illustrated in FIG. 3A. Further, FIGS. 3A through 3C show an AC grid current $I_G$ provided from the half-bridge converter to the AC output. As illustrated, a phase of the grid current $I_G$ may change in relation to the grid voltage $V_G$ such that a power factor of the power converter circuitry 18 changes. The timing of switching control signals provided by the power converter control circuitry 24 to the switching elements in the power converter circuitry 18 may change in response to changes in the power factor in order to properly deliver the grid voltage $V_G$ and the grid current $I_G$. The link capacitor $C_{LINK}$ must be designed to adequately supply power to maintain the grid voltage $V_G$ and the grid current $I_G$ at the desired values in both leading and lagging power factor situations. Accordingly, the capacitance of the link capacitor $C_{LINK}$ must be chosen based on the worst case scenario, which is the leading power factor shown in FIG. 3C. In various embodiments, the link capacitor $C_{LINK}$ may be designed such that the power converter circuitry 18 is capable of operating at power factors between 0.7 and 1, leading or lagging. For an output power of 2 kW, the power converter circuitry 18 may provide a 120 Hz ripple component in the input voltage $V_{IN}$ attributable to the power pulsation of the AC electrical grid 14 around 4.2 V peak-to-peak, which is around 1.05% of a 400 V input voltage, as may be typical for the photovoltaic panel 12, which may provide efficiency as high as 95.7% and a total harmonic distortion of 2.1%.

The boost inductor $L_B$ and the half-bridge inductor $L_{HB}$ may be designed through loss and volume optimization in order to meet total harmonic distortion requirements. The objective in the design of the boost inductor $L_B$ and the half-bridge inductor $L_{HB}$ is to minimize volume and losses, which include conduction losses, switching loss, and inductor copper and core losses. When a power output of the power converter circuitry 18 is greater than 2 kW, the link capacitor $C_{LINK}$ may have a capacitance of 30 μF with a maximum voltage of 1100 V, the input capacitor may have a capacitance of 5 μF with a maximum voltage of 500 V, the boost inductor $L_B$ may have an inductance of 230 μH, the half-bridge inductor $L_{HB}$ may have an inductance of 230 μH, and a switching frequency of the power converter circuitry 18 may be 75 kHz. In one embodiment, the boost inductor $L_B$ and the half-bridge inductor $L_{HB}$ are implemented on a common magnetic structure as coupled inductors.

FIGS. 4A through 4D illustrate the basic premise of operation of the power converter circuitry 18. These figures show switching control signals provided to the first boost switching element $Q_{B1}$ and the second boost switching element $Q_{B2}$, which are provided in an alternating fashion such that when the first boost switching element $Q_{B1}$ is closed, the second boost switching element $Q_{B2}$ is open, and vice versa. Similarly, switching control signals provided to the first half-bridge switching element $Q_{HB1}$ and the second half-bridge switching element $Q_{HB2}$ are provided in an alternating fashion such that when the first half-bridge switching element $Q_{HB1}$ is closed, the second half-bridge switching element $Q_{HB2}$ is open, and vice versa. The duty cycles of the switching signals are changed by the power converter control circuitry 24 in order to move from a first point P1 in the grid voltage $V_G$, which is a negative peak, to a second point P2, which is a neutral point, and a third point P3, which is a positive peak. The intermediate duty cycles of the switching control signals can be extrapolated from those shown. Those skilled in the art will appreciate that the switching control signals may change in order to provide a desired power factor as discussed above.

The power converter control circuitry 24 may measure voltages and/or currents from various points in the power converter circuitry 18 (e.g., the input voltage $V_{IN}$, an input current $I_{IN}$, the link voltage $V_{LINK}$, the grid voltage $V_G$, the grid current $I_G$, or the voltage and/or current at any other point) and adjust the switching control signal provided to the first boost switching element $Q_{B1}$, the second boost switching element $Q_{B2}$, the first half-bridge switching element $Q_{HB1}$, and the second half-bridge switching element $Q_{HB2}$ accordingly. In one embodiment, the power converter control circuitry 24 uses maximum power point tracking to provide the switching control signals to the first boost switching element $Q_{B1}$ and the second boost switching element $Q_{B2}$ in order to maximize power extraction from the photovoltaic panel 20, the details of which will be appreciated by those skilled in the art. The power converter control circuitry 24 may further use a proportional-integral control along with a sinusoidal reference signal generated by a phase-locked loop in order to provide the switching control signals to the first half-bridge switching element $Q_{HB1}$ and the second half-bridge switching element $Q_{HB2}$ and thus provide a desired AC output signal to the AC electrical grid 22.

The topology of the power converter circuitry 18 provides several benefits. First, because the first DC input node $DC_{IN1}$ and the first AC output node $AC_{OUT1}$ are coupled together and the first AC output node $AC_{OUT1}$ is coupled to a neutral connection of the AC electrical grid 22, at least one of the terminals of the photovoltaic panel 20 is effectively grounded. Grounding at least one of the terminals of the photovoltaic panel 20 effectively nullifies any parasitic capacitance that may be present between a chassis on which the photovoltaic panel 20 is provided (which is generally grounded as mandated by code) and the photovoltaic panel 20 itself. Accordingly, the performance of the power converter circuitry 18 may be significantly improved.

Second, the topology of the power converter circuitry 18 significantly reduces the required size (i.e., volume) of the link capacitor $C_{LINK}$ when compared to conventional approaches. This in turn allows for the use of a capacitor that is not electrolytic. For example, the link capacitor $C_{LINK}$ may be a film capacitor or the like due to the relatively small capacitance required thereof. In some embodiments, the capacitance of the link capacitor $C_{LINK}$ is less than 50.0 μF with a maximum voltage of 1100 V for a power output of the power converter circuitry 18 greater than 2 kW. In various embodiments, the capacitance of the link capacitor $C_{LINK}$ may be less than 40 μF, and even less than 35 μF. In one embodiment, a power module based on the topology discussed herein measures 139 mm by 122 mm, with a separate control board measuring 70 mm by 68 mm. The boost inductor $L_B$ and the half-bridge inductor $L_{HB}$ may be ferrite core planar inductor cores assembled with Litz wire for maximum efficiency and measure 58 mm by 38 mm.

When compared to the power converter circuitry 10 discussed above with respect to FIG. 1, the location of the link capacitor $C_{LINK}$ is moved. Accordingly, rather than providing a buck-boost converter and a half-bridge converter, the power converter circuitry 18 discussed herein provides a boost converter and a half-bridge converter. These changes in topology and the corresponding changes in the operation of the power converter circuitry 18 as a result thereof allow the size of the link capacitor $C_{LINK}$ to be further reduced when compared to the approach discussed above. Specifically, volume reductions of up to 15% for the link capacitor $C_{LINK}$ may be achieved when using the power converter circuitry 18 discussed herein due to the increased voltage placed across the link capacitor $C_{LINK}$ in this topology. Additionally, the new position of the link capacitor $C_{LINK}$ changes the current provided through the boost inductor $L_B$. Specifically, the boost inductor $L_B$ in the power converter circuitry 18 may experience up to a 5% reduction in RMS current when compared to the buck-boost inductor $L_{BB}$ shown in the power converter circuitry 10 discussed above with respect to FIG. 1. This may result in reduced copper losses and thus increased efficiency of the power converter circuitry 18. Furthermore, the new position of $C_{LINK}$ reduces the high frequency RMS current in the input capacitor $C_{IN}$ by about 80% when compared to the power converter circuitry 10 discussed above with respect to FIG. 1.

Figure 5:
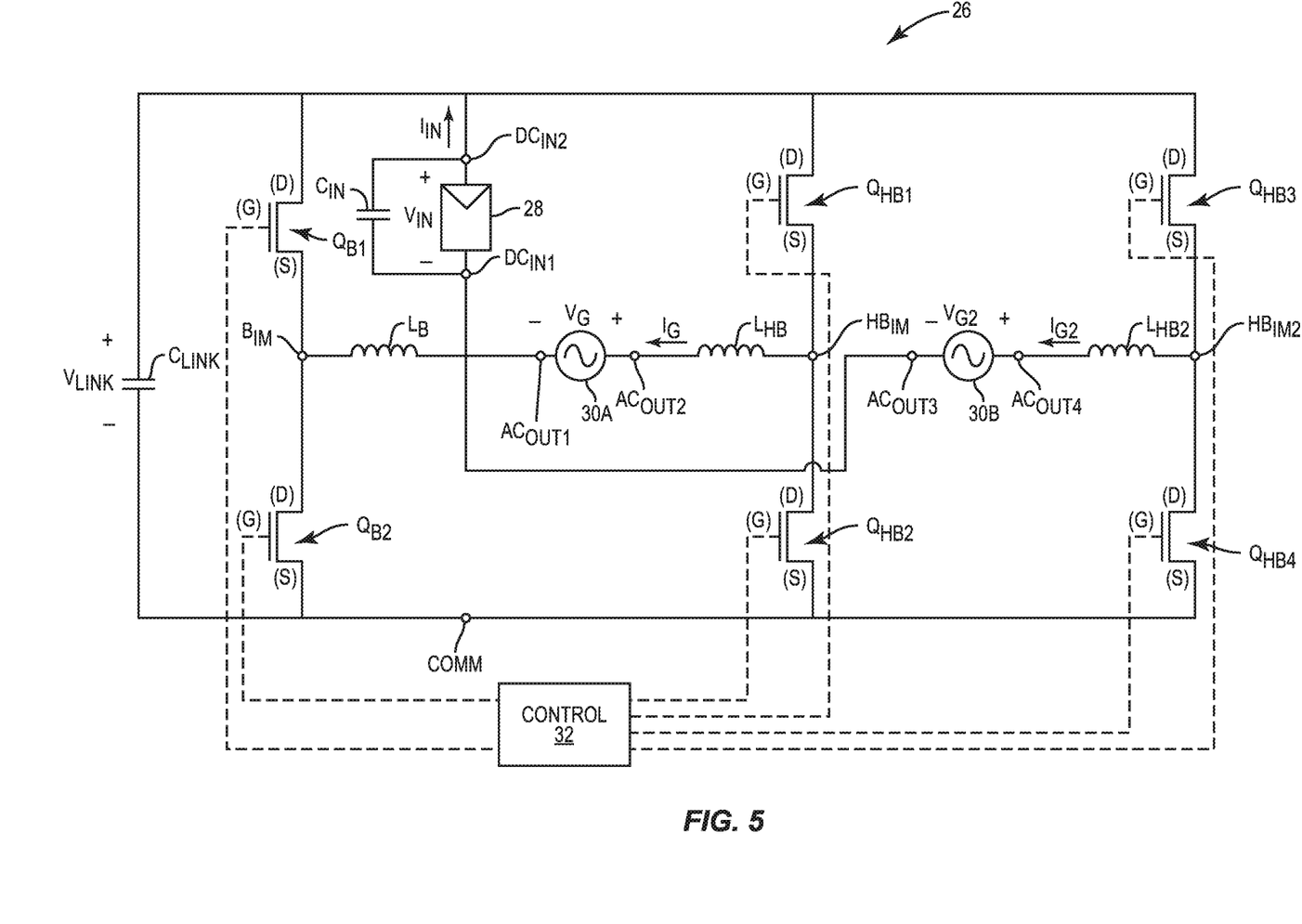
FIG. 5 is a functional schematic illustrating power converter circuitry according to one embodiment of the present disclosure.

While FIG. 2 shows power converter circuitry 18 for a single-phase AC electrical grid, the principles of the present disclosure may also be applied to a multi-phase AC system. FIG. 5 thus shows power converter circuitry 26 for a split-phase AC electrical grid according to one embodiment of the present disclosure. The power converter circuitry 26 shown in FIG. 5 is substantially similar to that shown in FIG. 2 and includes the DC input, the AC output, the link capacitor $C_{LINK}$, the boost converter, and the half-bridge converter as described above. Further, the power converter circuitry 26 includes an additional AC output comprising a third AC output node $AC_{OUT3}$ and a fourth AC output node $AC_{OUT4}$ and an additional half-bridge converter. The third AC output node $AC_{OUT3}$ is coupled to the first DC input node $DC_{IN1}$. The additional half-bridge converter includes a third half-bridge switching element $Q_{HB3}$ coupled between the second DC input node $DC_{IN2}$ and a second half-bridge intermediate node $HB_{IM2}$, a fourth half-bridge switching element $Q_{HB4}$ coupled between the second half-bridge intermediate node $HB_{IM2}$ and the common node COMM, and a second half-bridge inductor $L_{HB2}$ coupled between the second half-bridge intermediate node $HB_{IM22}$ and the fourth AC output node $AC_{OUT4}$. For context, a photovoltaic panel 28 is coupled between the first DC input node $DC_{IN1}$ and the second DC input node $DC_{IN2}$, a first phase of an AC electrical grid 30A is coupled to the AC output, and a second phase of the AC electrical grid 30B is coupled to the additional AC output.

The power converter circuitry 26 shown in FIG. 5 operates in substantially the same manner as that discussed above, and thus enjoys the same benefits. However, the benefits discussed above may be even more significant in the case of the split-phase topology. In particular, both a peak current through the boost inductor $L_B$ and an RMS current through the boost inductor $L_B$ may be significantly reduced (e.g., by 41% and 18%, respectively, when compared to the power converter circuitry 10 discussed above with respect to FIG. 1) such that the efficiency of the power converter circuitry 26 is significantly increased. In one embodiment, the first half-bridge inductor $L_{HB1}$ and the second half-bridge inductor $L_{HB2}$ are implemented on a common magnetic structure as coupled inductors.

Those skilled in the art will recognize improvements and modifications to the preferred embodiments of the present disclosure. All such improvements and modifications are considered within the scope of the concepts disclosed herein and the claims that follow.

What is claimed is:

1. Power converter circuitry comprising:
a direct current (DC) input;
an alternating current (AC) output coupled to the DC input;
a boost converter comprising a first boost switch and a second boost switch coupled between the DC input and a boost converter output and configured to receive a DC input signal from a DC device coupled to the DC input and provide a boosted DC signal at the boost converter output;
a link capacitor coupled across the DC input and the boost converter output, wherein the link capacitor is sized to provide a capacitance configured to cause the power converter circuitry to operate at a power factor between 0.7 and 1; and
a half-bridge converter coupled between the boost converter output and the AC output and configured to receive the boosted DC signal and provide an AC output signal at the AC output.

2. The power converter circuitry of claim 1 further comprising control circuitry coupled to the boost converter and the half-bridge converter and configured to:
maintain a power drawn from the DC device coupled to the DC input at a substantially constant value; and
provide the AC output signal at the AC output.

3. The power converter circuitry of claim 2 wherein the control circuitry is further configured to track a maximum power point of an output of the DC device.

4. The power converter circuitry of claim 3 wherein the control circuitry is further configured to maximize a power conversion efficiency of the power converter circuitry.

5. The power converter circuitry of claim 4 wherein the control circuitry is further configured to control the state of one or more switches in the half-bridge converter based on a voltage at the output of the DC device, a current at the output of the DC device, and a voltage at the AC output.

6. The power converter circuitry of claim 1 further comprising:
an additional AC output; and
an additional half-bridge converter coupled between the boost converter output and the additional AC output and configured to receive the boosted DC signal and provide an additional AC output signal at the additional AC output.

7. The power converter circuitry of claim 6 further comprising control circuitry coupled to the boost converter, the half-bridge converter, and the additional half-bridge converter and configured to:
maintain a power drawn from the DC device coupled to the DC input at a substantially constant value; and
provide the AC output signal at the AC output.

8. The power converter circuitry of claim 7 wherein the control circuitry is further configured to track a maximum power point of an output of the DC device.

9. The power converter circuitry of claim 8 wherein the control circuitry is further configured to maximize a power conversion efficiency of the power converter circuitry.

10. The power converter circuitry of claim 9 wherein the control circuitry is further configured to control a state of one or more switches in the half-bridge converter and the additional half-bridge converter based on a voltage at the output of the DC device, a current at the output of the DC device, and a voltage at the AC output.

* * * * *

UNITED STATES PATENT AND TRADEMARK OFFICE
CERTIFICATE OF CORRECTION

| | | |
|---|---|---|
| PATENT NO. | : 10,879,839 B2 | Page 1 of 1 |
| APPLICATION NO. | : 15/780840 | |
| DATED | : December 29, 2020 | |
| INVENTOR(S) | : Rajapandian Ayyanar et al. | |

It is certified that error appears in the above-identified patent and that said Letters Patent is hereby corrected as shown below:

In the Specification

In Column 1, Lines 16-20, replace:
"The information, data, or work presented herein was funded in part by the Office of Energy Efficiency and Renewable Energy (EERE), U.S. Department of Energy, under Award Number DE-EE0006521 with North Carolina State University, PowerAmerica Institute."
With:
--This invention was made with government support under DE-EE0006521 awarded by the U.S. Department of Energy. The government has certain rights in the invention.--

Signed and Sealed this
Sixth Day of May, 2025

Coke Morgan Stewart
*Acting Director of the United States Patent and Trademark Office*